(12) United States Patent
Biskeborn et al.

(10) Patent No.: US 10,014,022 B1
(45) Date of Patent: Jul. 3, 2018

(54) FLEXIBLE MEDIA BURNISHING APPARATUS AND METHOD

(71) Applicant: International Business Machines Corporation, Armonk, NY (US)

(72) Inventors: Robert G. Biskeborn, Hollister, CA (US); Gary M. Decad, Palo Alto, CA (US); Jason Liang, Campbell, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/398,628

(22) Filed: Jan. 4, 2017

(51) Int. Cl.
*G11B 5/78* (2006.01)
*G11B 5/84* (2006.01)
*B24B 1/00* (2006.01)

(52) U.S. Cl.
CPC .................. *G11B 5/78* (2013.01); *B24B 1/00* (2013.01); *G11B 5/84* (2013.01)

(58) Field of Classification Search
CPC .................................... G11B 5/78; G11B 5/84
USPC ................... 360/121, 122, 134, 231; 451/58
See application file for complete search history.

(56) References Cited

U.S. PATENT DOCUMENTS

| | | | |
|---|---|---|---|
| 3,943,666 A | 3/1976 | Dion et al. | |
| 4,254,585 A | 3/1981 | Schoettle et al. | |
| 4,514,937 A | 5/1985 | Gehrung et al. | |
| 6,033,723 A * | 3/2000 | Kistler | B05C 1/083 |
| | | | 118/249 |
| 6,433,959 B1 * | 8/2002 | Lakshmikumaran | G11B 5/10 |
| | | | 360/122 |
| 6,690,542 B1 * | 2/2004 | Wang | G11B 5/115 |
| | | | 360/129 |
| 6,796,884 B1 * | 9/2004 | Tran | G11B 5/8404 |
| | | | 451/300 |
| 7,241,204 B2 | 7/2007 | Watanabe et al. | |
| 7,751,154 B2 * | 7/2010 | Wu | G11B 5/3166 |
| | | | 360/313 |
| 7,803,471 B1 * | 9/2010 | Ota | G11B 23/502 |
| | | | 428/845.6 |
| 8,542,460 B2 * | 9/2013 | Biskeborn | G11B 5/1871 |
| | | | 360/121 |
| 9,230,590 B1 * | 1/2016 | Biskeborn | G11B 5/48 |
| 2002/0006004 A1 * | 1/2002 | Miyamura | G11B 5/00813 |
| | | | 360/53 |
| 2003/0039045 A1 * | 2/2003 | Biskeborn | G11B 15/62 |
| | | | 360/27 |
| 2003/0151853 A1 * | 8/2003 | Fahimi | G11B 23/502 |
| | | | 360/137 |

(Continued)

*Primary Examiner* — Jefferson Evans
(74) *Attorney, Agent, or Firm* — Zilka-Kotab, P.C.

(57) ABSTRACT

An apparatus for burnishing media, according to one embodiment, includes a first block with a media bearing surface having a plurality of channels and lands. The channels and lands alternate in a direction of media travel. Each of the lands has at least one skiving edge along a width thereof. The width of each land extends orthogonally to the direction of media travel. The apparatus also includes a mechanism for inducing a wrap angle of the media relative to media bearing surfaces of at least some of the lands. Each induced wrap angle is greater than zero degrees. An apparatus for burnishing media according to another embodiment includes channels having widths that are less than a width of the media.

19 Claims, 12 Drawing Sheets

(56) References Cited

U.S. PATENT DOCUMENTS

2006/0034021 A1* 2/2006 Wu ..................... G11B 5/3163
360/316
2007/0183091 A1* 8/2007 Saliba ................ G11B 5/00826
360/122

* cited by examiner

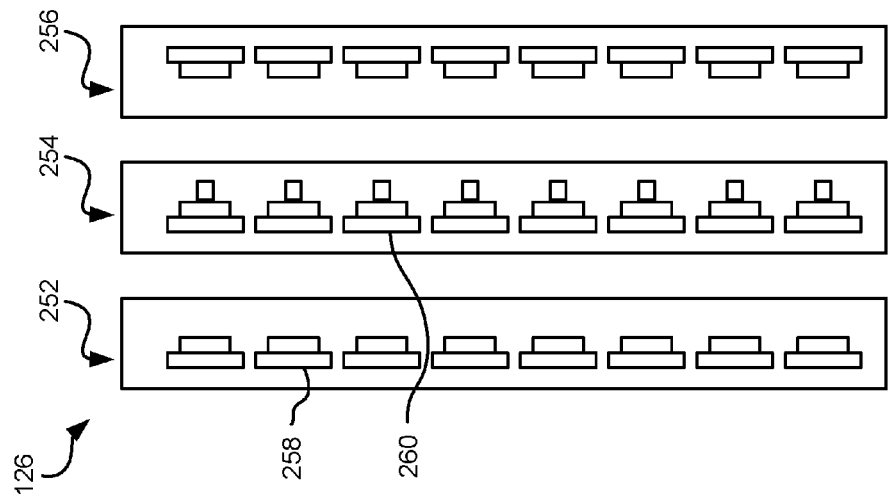
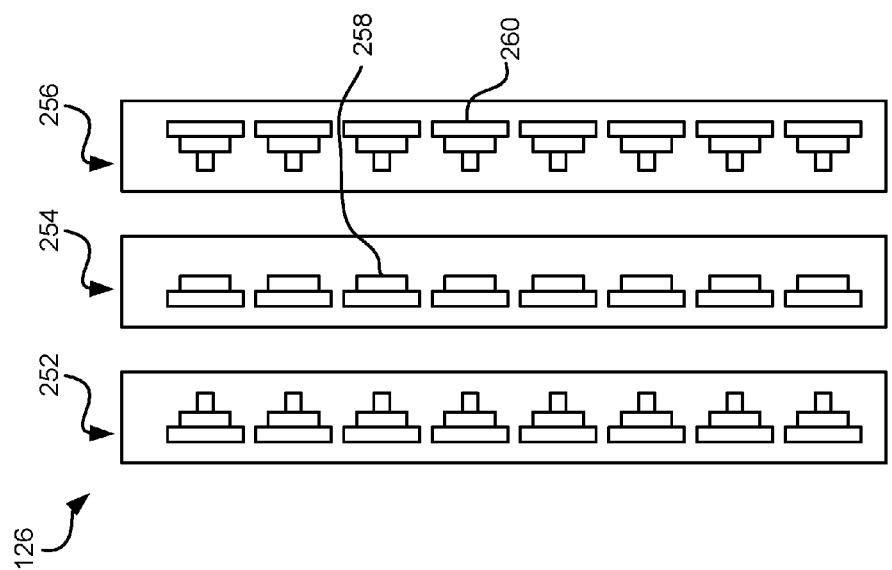

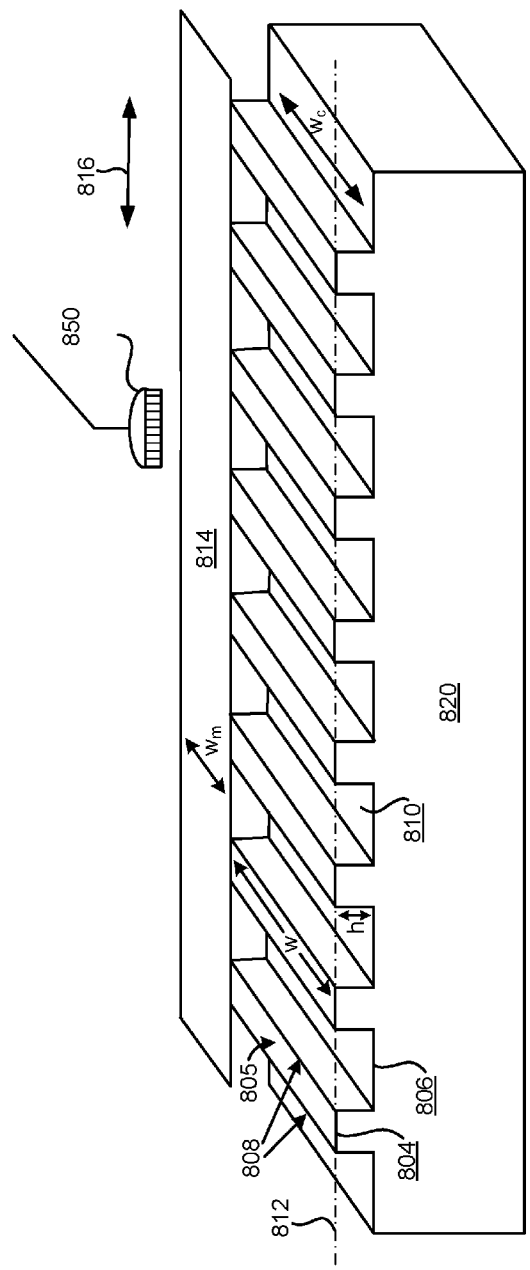
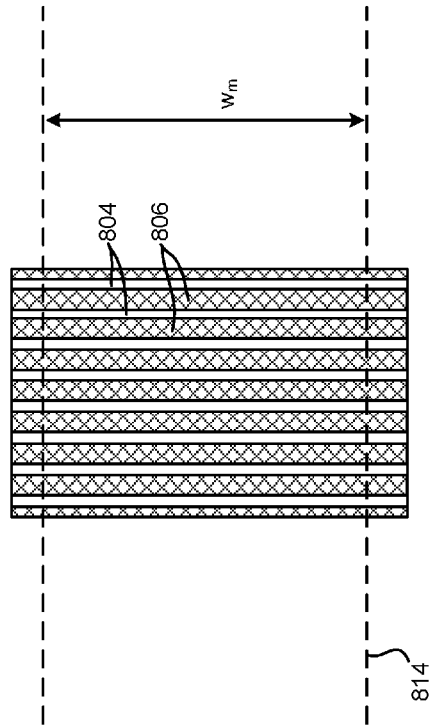
FIG. 8C
FIG. 8D

FLEXIBLE MEDIA BURNISHING APPARATUS AND METHOD

BACKGROUND

The present invention relates to data storage systems, and more particularly, this invention relates to an apparatus that may be particularly useful for burnishing magnetic flexible media.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

An apparatus for burnishing media, according to one embodiment, includes a first block with a media bearing surface having a plurality of channels and lands. The channels and lands alternate in a direction of media travel. Each of the lands has at least one skiving edge along a width thereof. The width of each land extends orthogonally to the direction of media travel. The apparatus also includes a mechanism for inducing a wrap angle of the media relative to media bearing surfaces of at least some of the lands. Each induced wrap angle is greater than zero degrees.

An apparatus for burnishing media according to another embodiment includes a first block with a media bearing surface having a plurality of channels and lands. The channels and lands alternate in a direction of media travel. Each of the lands has at least one skiving edge along a width thereof, the width of each land extending orthogonally to the direction of media travel. A width of at least some of the channels is less than a width of the media.

Any of these embodiments may be implemented in a system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

FIG. 8C is a perspective view of the block of FIG. 8A.

FIG. 8D is a top down view of a block for burnishing tape media according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus for burnishing media includes a first block with a media bearing surface having a plurality of channels and lands. The channels and lands alternate in a direction of media travel. Each of the lands has at least one skiving edge along a width thereof. The width of each land extends orthogonally to the direction of media travel. The apparatus also includes a mechanism for inducing a wrap angle of the media relative to media bearing surfaces of at least some of the lands. Each induced wrap angle is greater than zero degrees.

In another general embodiment, an apparatus for burnishing media includes a first block with a media bearing surface having a plurality of channels and lands. The channels and lands alternate in a direction of media travel. Each of the lands has at least one skiving edge along a width thereof, the width of each land extending orthogonally to the direction of media travel. A width of at least some of the channels is less than a width of the media.

Figure 1A:
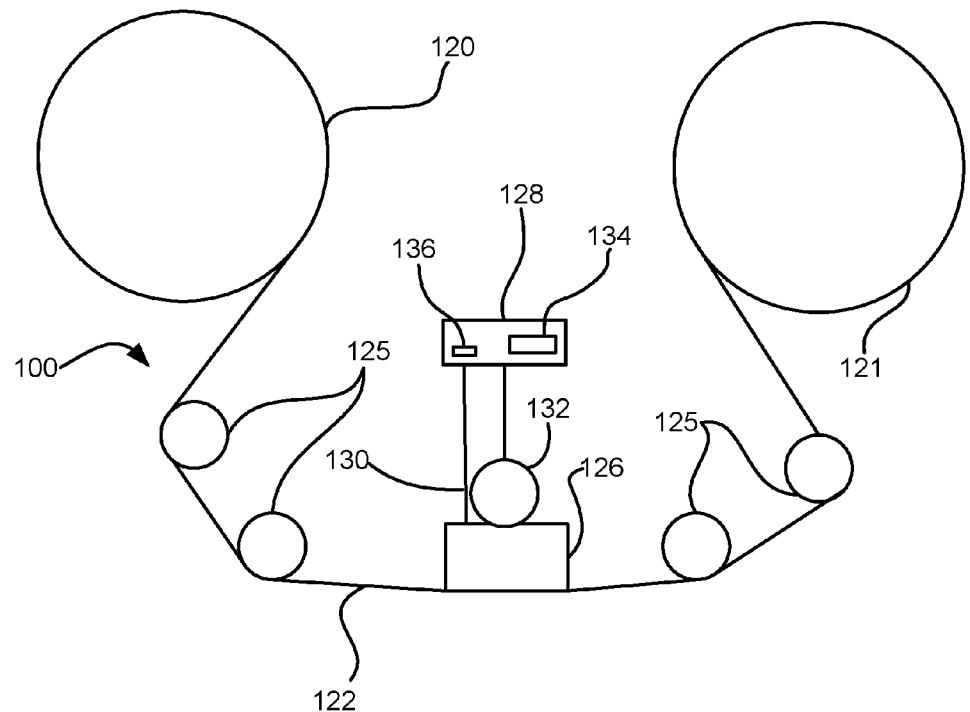
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
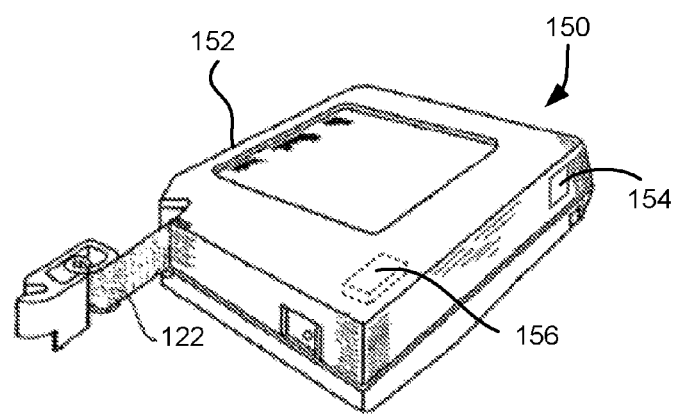
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or another device.

Figure 2:
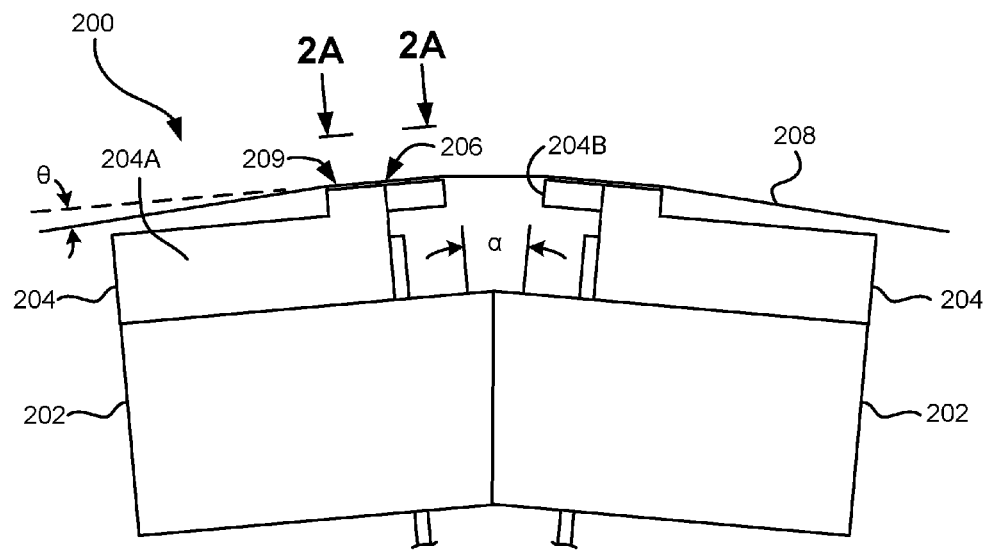
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle $\alpha$ with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle $\theta$ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
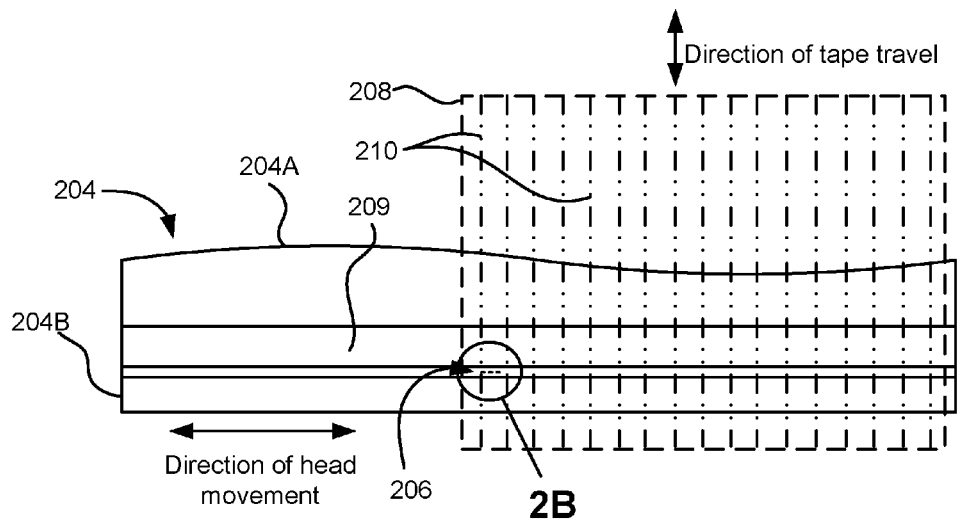
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
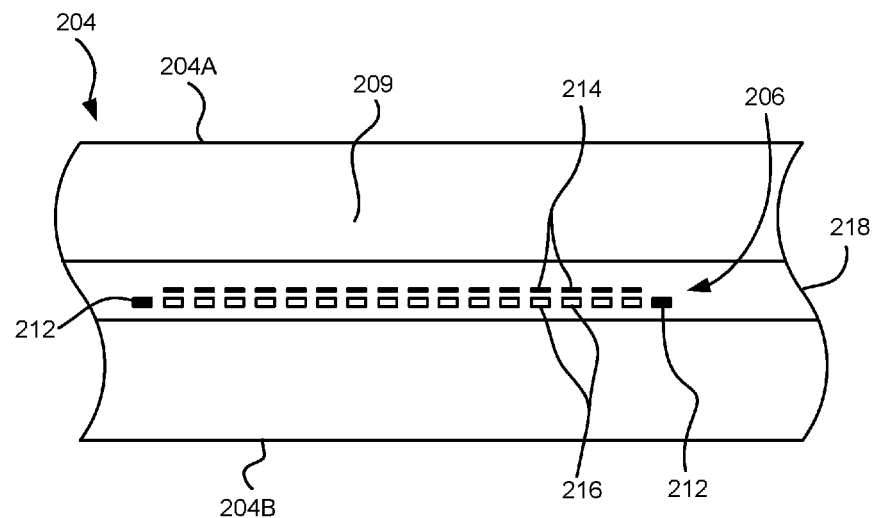
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
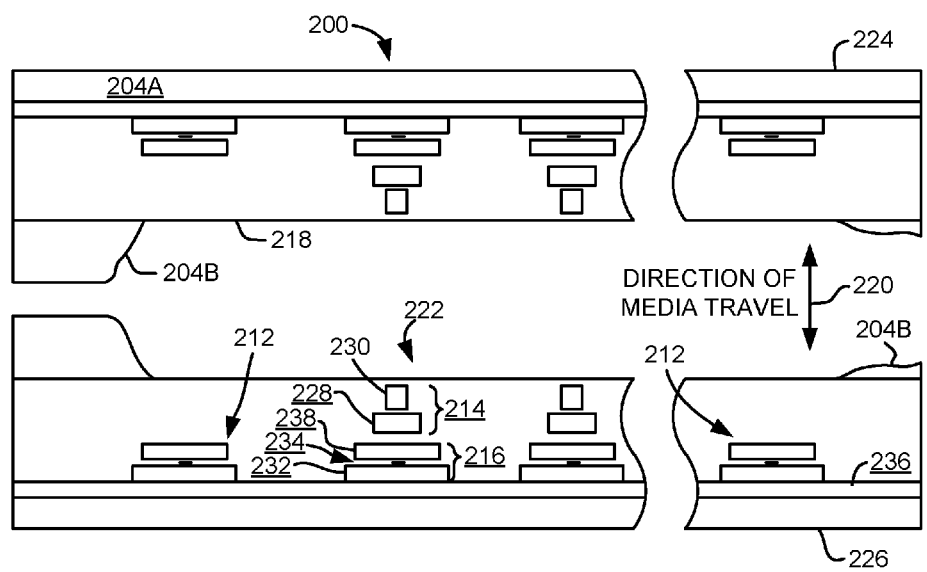
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
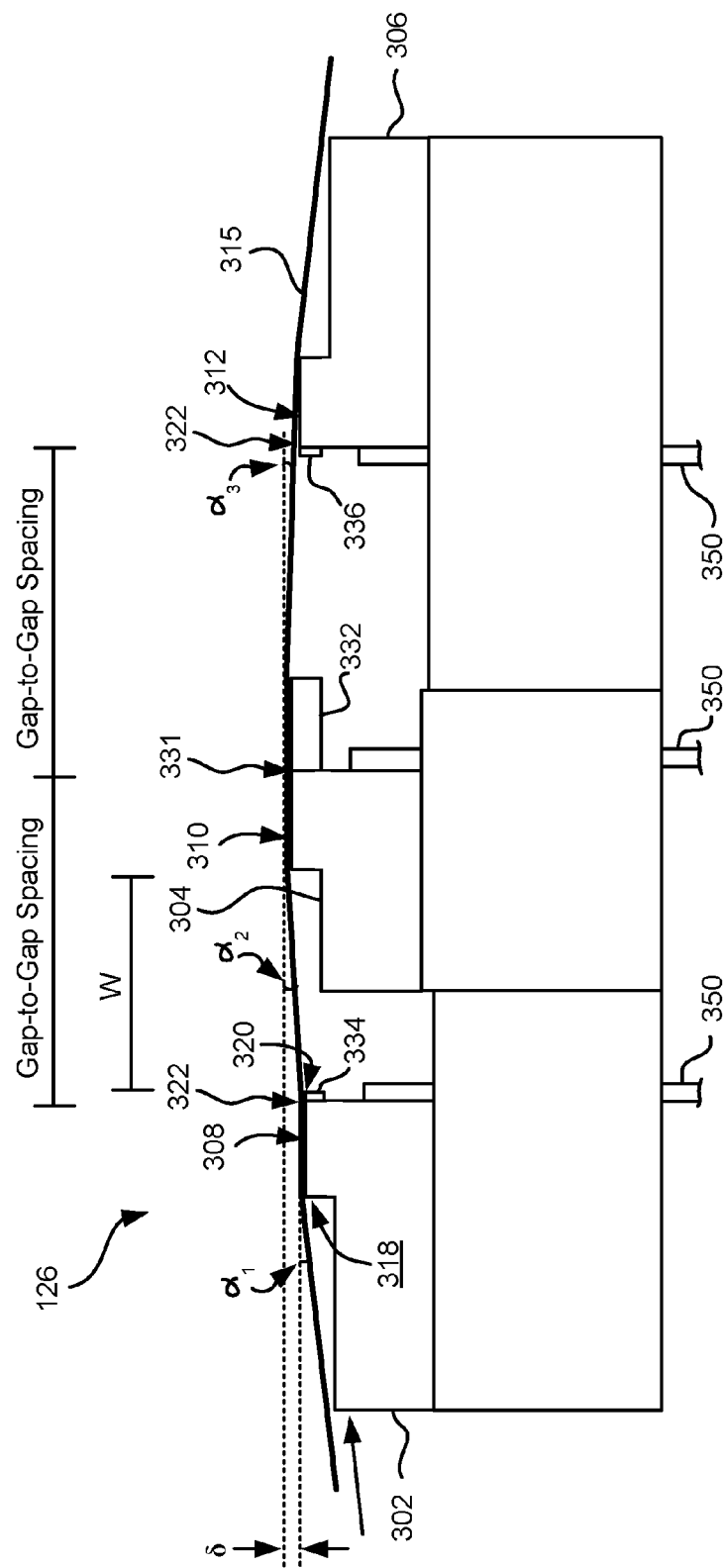
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
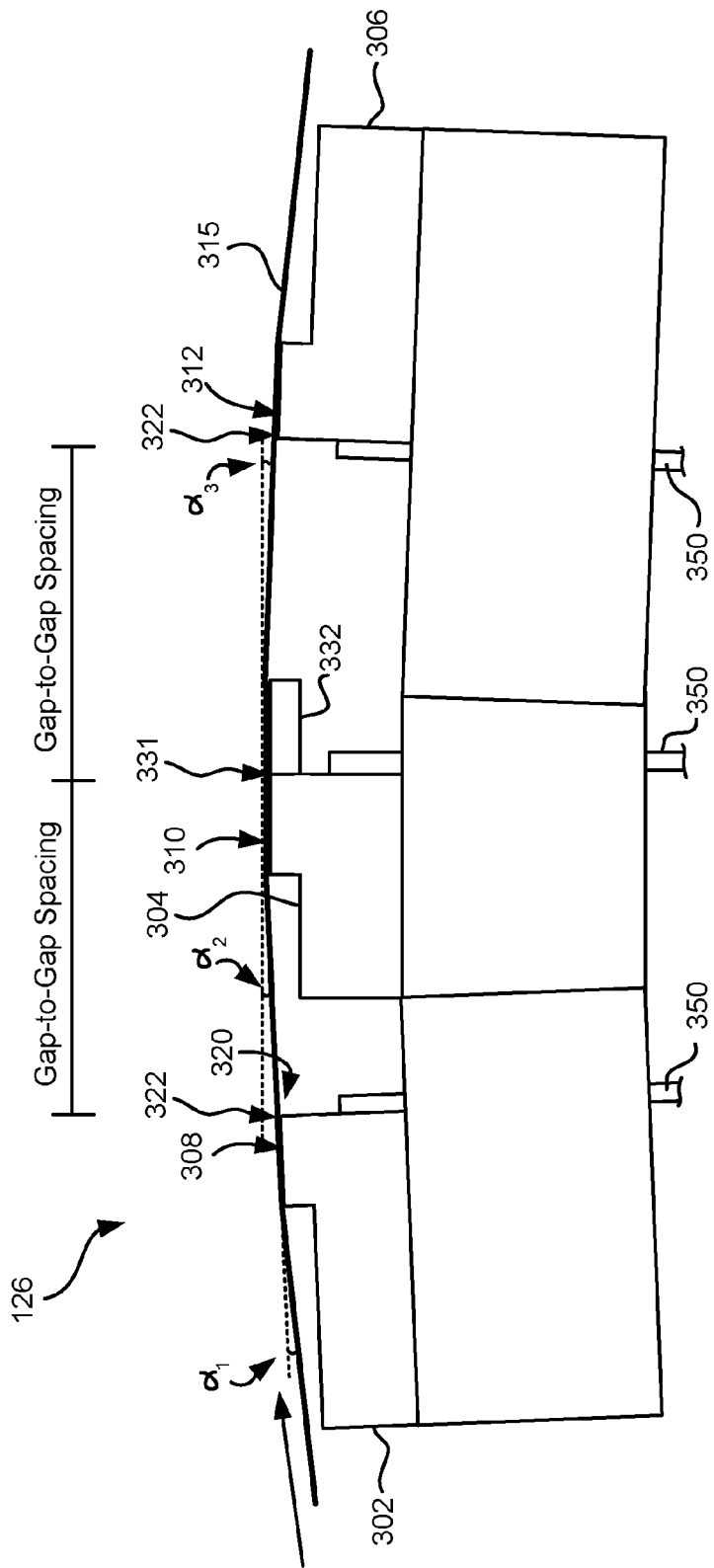
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
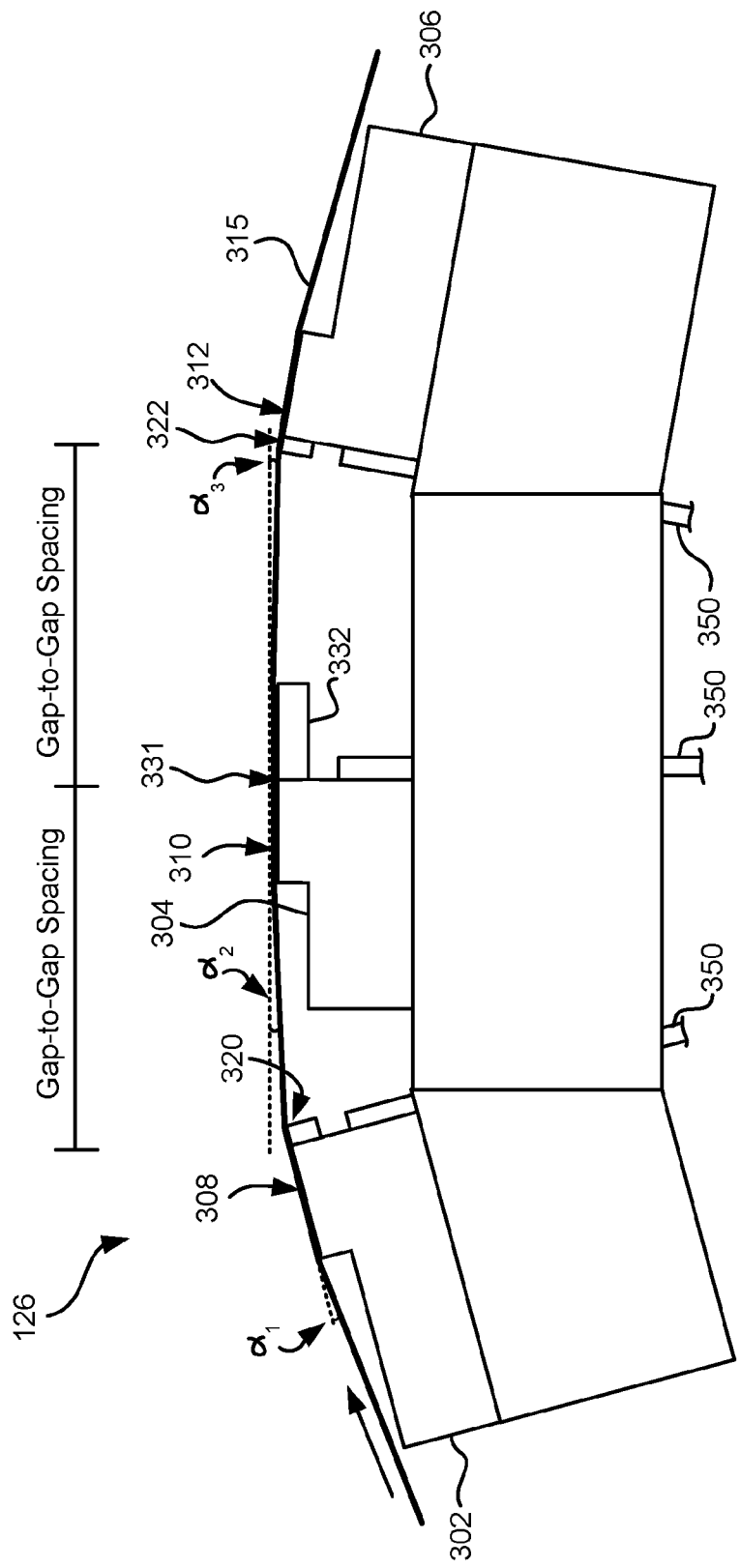
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Servo pattern and data read sensors may experience shorting failures during normal data writing and/or reading operations. Particularly, such shorting may be caused by protruding defects (herein "surface defects") in the magnetic tape recording media (also generically referred to as "tape"), such as agglomerations of abrasive particles or other defects, e.g., hard particulates, that protrude from the tape surface. Such surface defects may smear and/or plow conductive material from the thin films of the reader across the sensor, thereby creating an electrical short.

While this issue is relevant to current-perpendicular-to-plane (CPP) readers in general, this problem is particularly problematic with CPP TMR sensors. Because the deposition thickness of the tunnel barrier the TMR sensor is very thin, e.g., less than about 12 angstroms in some approaches. TMR sensors may be particularly susceptible to such shorting.

Interactions between tape media surface defects and a sensor surface may also lead to friction-related functionality issues. For example, when a surface defect passes over a sensor, friction may lead to plastic deformation of one or more delicate thin films of the sensor. Plastic deformation of the delicate thin films may alter the stress distribution inside the sensor, which in turn may be presented as noise due to magnetic instability, e.g., switching magnetic domains.

Narrower write heads may also be subject to degradation via spacing loss resulting from gouges caused by tape surface defects. Such problematic tape surface defects may protrude from the surface of the tape, and may include one or more agglomerations of abrasive particles. The surface defects may also include dense agglomerations of binder materials, wear particles, isolated particle defects, etc.

Such surface defects may result from, e.g., the milling of particles used in the tape, e.g., where a larger particle is inadvertently added to the tape media during manufacture.

Despite filtering systems and quality control used by tape media manufacturers, including tape burnishing via lapping tape, some tapes still contain defects that are capable of damaging magnetic tape heads. As the defective media runs over the TMR structure of the sensor, a conductive smear may develop leading to a short of the head. As a result, the sensor shows a resistance reduction with a loss of output. Thus, it would be desirable to pre-condition the media by blunting and smoothing the defects before running the media over the tape head.

Conventional methods of cleaning or running the newly manufactured magnetic recording media over a blade are not sufficient to pre-condition and remove particulate defects from the media for running over a TMR sensor, because particulate defects are often persistent and resistant to burnishing during operating a drive. For example, a particulate defect that remains after the manufacturing process and damages a track on a head may also have the ability to damage the same track on a head in another drive. It would be desirable for the burnishing method of pre-conditioning defective tapes to involve an apparatus that is harder than the particulates in the media in order to prevent the particulate debris from damaging the TMR sensor.

Various embodiments described herein involve an apparatus having a hard material that wraps the tape under tension on sharp edges at different angles in a repetitive manner to blunt the defects and ultimately smooth the tape surface.

Figure 8A:
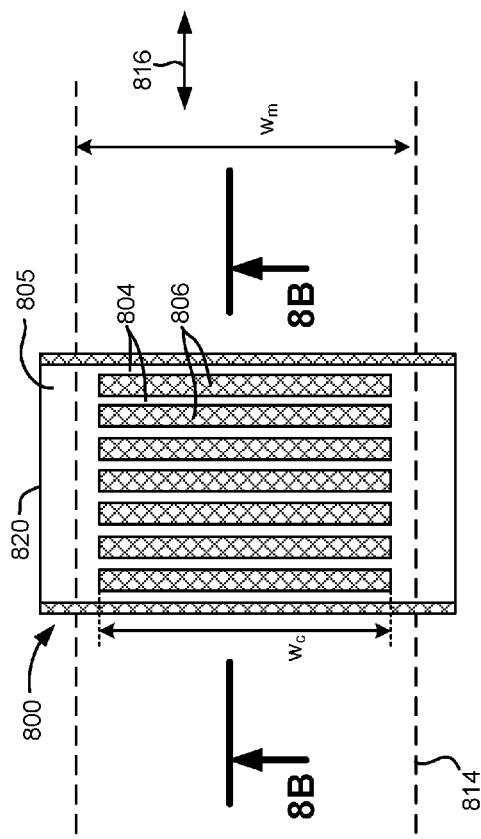
FIG. 8A is a top down view of a block for burnishing tape media according to one embodiment.
Figure 8B:
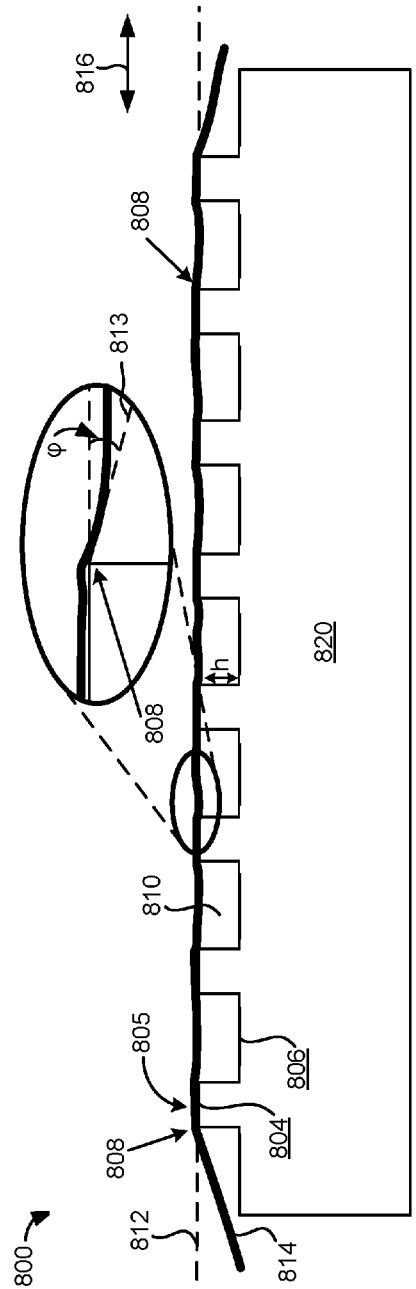
FIG. 8B is a cross sectional side view taken along Line 8B-8B of FIG. 8A.

FIGS. 8A-8C depict an apparatus 800 for burnishing tape media, in accordance with one embodiment. As an option, the apparatus 800 may be implemented in conjunction with features from any other embodiment listed herein, such as those described with reference to the other FIGS. Of course, however, such an apparatus 800 and others presented herein may be used in various applications and/or in permutations which may or may not be specifically described in the illustrative embodiments listed herein. Further, the apparatus 800 presented herein may be used in any desired environment.

According to one embodiment as shown in FIGS. 8A-8B, the apparatus 800 for burnishing media includes a first block 820 with a media bearing surface 805 having a plurality of channels 806 and lands 804, where the channels 806 and lands 804 may alternate in a direction of media travel 816. Looking to FIG. 8B, each of the lands 804 may have at least one skiving edge 808 along a width w in which the width w of each land 804 extending orthogonally to the direction of media travel 816.

Preferably, at least some of the channels 806 may be physically configured to reduce pressure 810 in the channel to below ambient pressure, creating a subambient condition therein, and thereby causing the media 814 to wrap an adjacent skiving edge 808 at a wrap angle φ as the media 814 travels in the direction of media travel 816 (as shown in FIG. 8B).

In some embodiments, widths $w_e$ of one or more of the channels may be less than a width $w_m$ of the media fir which the apparatus is designed. See FIG. 8A and the perspective view of FIG. 8C).

Looking to FIGS. 8A-8C, in some embodiments, because ends of the channels are closed and the widths $w_e$ of the channels are less than the width of the media, a subambient pressure 810 is created under the media 814 when the media moves over the channels and entrains air out of the channel. The resultant subambient condition induces the media 814 to deflect into the channels 806 and wrap the edges 808 at a wrap angle φ.

In preferred approaches, the induced wrap angle φ may be greater than zero degrees as measured between a plane 812 of the tape bearing surface and a straight line 813 tangent to the tape adjacent the edge 808 and intersecting the edge 808. See the detailed excerpt in FIG. 8B.

According to one embodiment, the first block 820 may include at least one hard material, for example, silicon carbide, silicon nitride, boron nitride, sapphire, and/or diamond. In another embodiment, the first block 820 may include at least one composite material, for example, composite materials used in tool fabrication, such as silicon, zirconium nitride, AlTiC, silicon carbide, sapphire, etc.

A guide mechanism such as guides in FIG. 1A may be configured to set a wrap angle of a tape approaching the outermost skiving edges of the block. The guide mechanism may include, e.g., tape guides such as guides 125 of FIG. 1A, pitch rollers, a tension arm, etc.

The outermost wrap angle may be set, e.g., by the guide mechanism, to any angle that promotes the burnishing of surface defects off the tape media surface. According to one embodiment, the wrap angle may be at least one degree. According to preferred embodiments, the wrap angle may be in a range of about two to about three degrees.

Similarly, the induced wrap angle φ adjacent each land is preferably greater than 0 degrees. In general, a wrap angle higher than one degree is greater than would be used for conventional read/write operations because the high wrap angle results in higher friction, which is beneficial for burnishing but is not only unnecessary for read/write operations, but excessive friction can lead to deleterious velocity variations of the tape during read/write operations.

The optimal wrap angle to give the best burnishing effect may be limited by the degree of running friction of the tape media caused by the wrap angle. According to one embodiment, each induced wrap angle φ is in a range of about 0.1 to about 3 degrees, but may be higher or lower.

Looking to FIGS. 8B-8C, the media bearing surface 805 of each of the lands 804 may be planar, ideally with sharp, non-cusped edges 808. The height h of the lands 804 above a base of the channels 806 may be any value, and may be selected to provide a vacuum that provides the desired induced wrap angle φ. The height h of the lands 804 above a base of the channels 806 may be determined using datum structures or any other conventional technique. Exemplary values of the height h may include 0.5 microns to 10 microns, but could be higher or lower in various embodiments.

The length of each land as measured parallel to the direction of media travel 816 is preferably no longer than needed for the particular application, e.g., to reduce friction. In some embodiments, the lengths of the lands are preferably at least 100 microns in order to allow the wrap angles to form, but could be longer or shorter.

The length of each channel as measured parallel to the direction of media travel 816 may be any value, but is preferably at least as long as the length of the lands.

The channels may be formed using any suitable process. For closed-channel embodiments such as shown in FIG. 8A, etching may be preferred. In other approaches, the channels may be formed by machining e.g., by sawing or grinding.

In some embodiments, the media bearing surface 805 of the lands 804 may not be smooth, but rather have a roughened or bumpy texture. While conventional techniques for texturing a surface may be used, an exemplary method of roughening the lands may include employing an air-bearing spindle saw and/or an abrasive wheel. In other approaches, the texture may be formed on the media bearing surface, e.g., by molding during ceramic formation. In some approaches, about 50 nm of RA of surface roughness on the lands, or higher, may reduce friction of the tape media running over the lands.

According to one embodiment of a method for using the apparatus 800, the method may involve running the media 814 over the first block 820 in the direction of media travel 816 and/or the opposite direction one or more times.

In some approaches, the apparatus 800 may include a mechanism 850 for removing accumulated debris from the channels 806. See FIG. 8C. In one approach, a brush may sweep through the channels 806 at periodic intervals. In another approach, the mechanism may use compressed air. Further approaches may use a fabric, swab or the like to wipe away debris. In further approaches, a rotating, vibrating or otherwise moving mechanism may be used. The mechanism 850 may be automated, operate on demand, etc.

One embodiment of apparatus 800 may include a drive mechanism such as a motor or other known mechanism that is configured to cause the tape to move over the first block and a controller electrically coupled to the drive mechanism. For example, the motor or other known mechanism may drive a tape supply cartridge, e.g., tape supply cartridge 120 of FIG. 1A, and a take-up reel, e.g., take-up reel 121 also of FIG. 1A, of a drive in which the block is implemented in, to move the tape media over the block and/or other components of the drive.

FIG. 8D depicts a variant of FIG. 8A, where the channels 806 are wider than the width $w_m$ of the media 814.

In one embodiment, the apparatus may include a mechanism for inducing a wrap angle, of greater than zero degrees, of the media relative to media bearing surfaces of at least some of the lands. As will be described below with reference to FIGS. 9-11, such mechanism may include such features as a vacuum source, a second block, applied air pressure, and combinations thereof, in some approaches.

Figure 9:
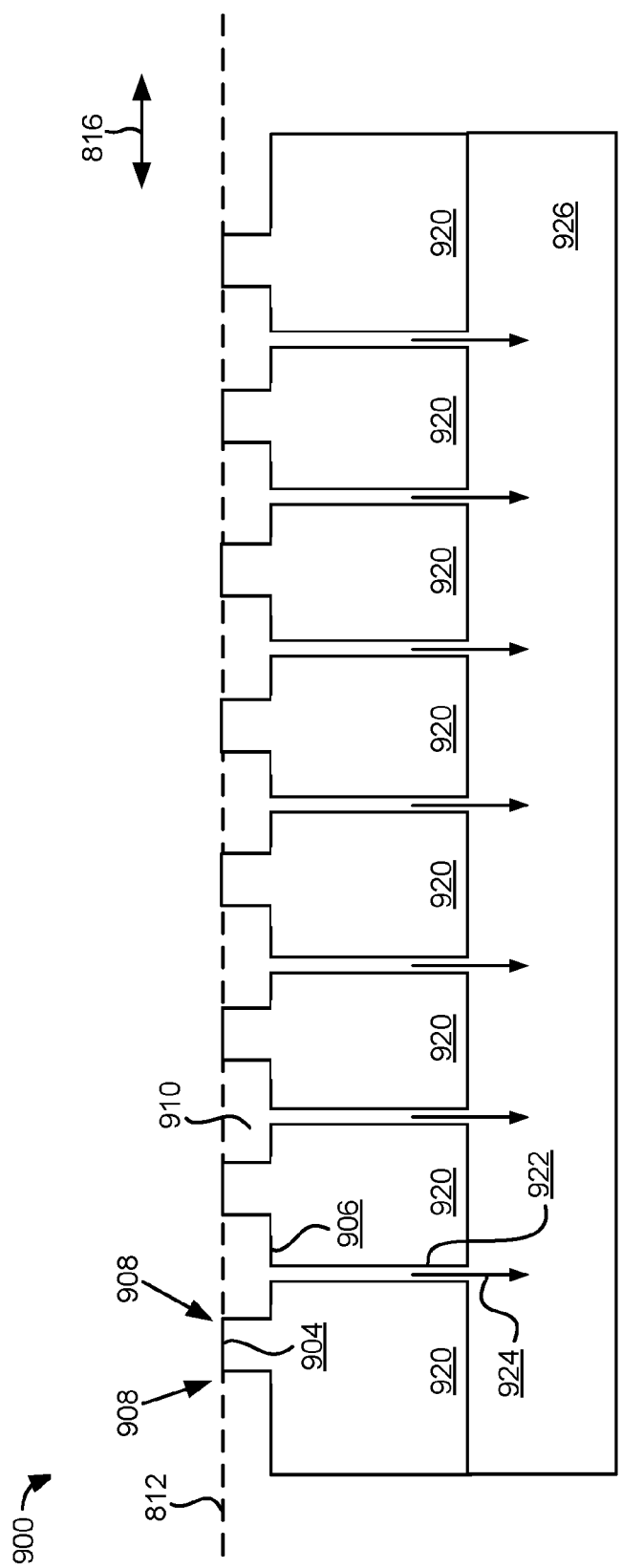
FIG. 9 is a cross-sectional side view of a block for burnishing tape media according to one embodiment.

FIG. 9 depicts an apparatus 900 for burnishing tape media, in accordance with one embodiment. As an option, the apparatus 900 may be implemented in conjunction with features from any other embodiment listed herein, such as those described with reference to the other FIGS. Of course, however, such an apparatus 900 and others presented herein may be used in various applications and/or in permutations which may or may not be specifically described in the illustrative embodiments listed herein. Further, the apparatus 900 presented herein may be used in any desired environment.

According to one embodiment as shown in FIG. 9, an apparatus 900 includes channels 906 of the first block 920 having an opening 922, e.g. cylindrical holes, slots, etc, that may connect to a vacuum source 926. The vacuum source 926 may create a subambient condition in one or more of the channels that urges the media toward the media bearing surfaces of the lands in the direction 924 orthogonal to the plane 812 of the media bearing surface. Each of the lands 904 may have at least one skiving edge 908 along a width of each land 904 extending orthogonally to the direction of media travel 816.

According to one embodiment, the subambient condition created by the vacuum source may induce wrap angles of the media relative to the tape bearing surface of each land. Moreover, the induced wrap angles may be commonly and/or individually adjusted, e.g., to a low or high wrap angle, by controlling the amount of vacuum applied by the vacuum source 926, potentially on a channel by channel basis.

According to another embodiment, an apparatus for burnishing tape media may include two blocks made of different materials or the same materials. The lands of the upper block may push the tape media into the channels of the lower block by pushing downward against the back of the tape media.

Figure 10:
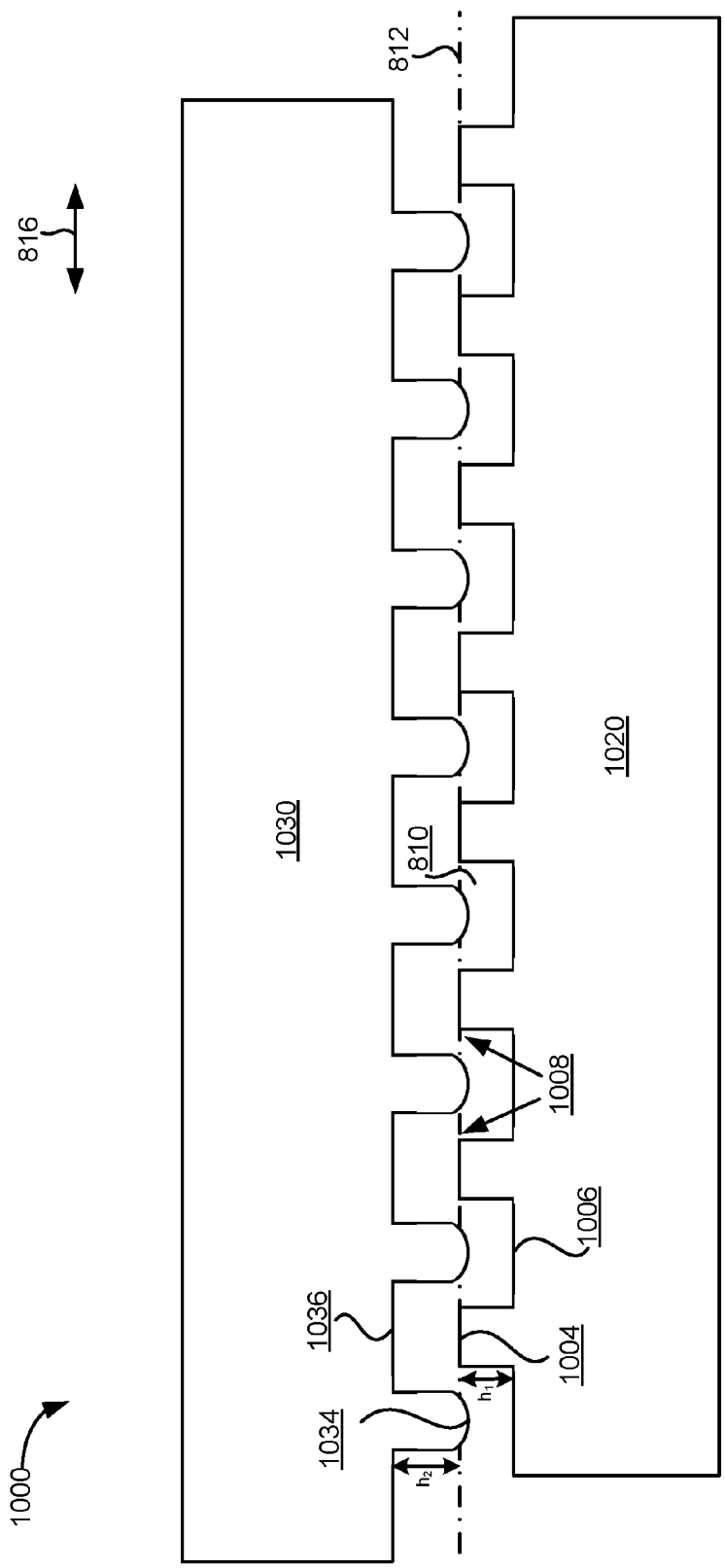
FIG. 10 is a side view of a set of blocks for burnishing tape media according to one embodiment.

FIG. 10 depicts an apparatus 1000 for burnishing tape media, in accordance with one embodiment. As an option, the apparatus 1000 may be implemented in conjunction with features from any other embodiment listed herein, such as those described with reference to the other FIGS. Of course, however, such an apparatus 1000 and others presented herein may be used in various applications and/or in permutations which may or may not be specifically described in the illustrative embodiments listed herein. Further, the apparatus 1000 presented herein may be used in any desired environment.

According to one embodiment as shown in FIG. 10, an apparatus 1000 for burnishing media includes a first block 1020 with a media bearing surface extending along a plane 812. The first block 1020 has a plurality of channels 1006 and lands 1004. The channels 1006 and lands 1004 may alternate in a direction of media travel 816. Each of the lands 1004 may have at least one skiving edge 1008 along a width thereof, the width of each land 1004 extending orthogonally (into the sheet of FIG. 10) to the direction of media travel 816. The apparatus 1000 has a second block 1030 positioned above the media bearing surface of the first block 1020. The second block 1030 has lands 1034 positioned relative to the first block 1020 to push the media into the channels 1006 of the first block 1020 to cause the media to wrap the skiving edges 1008 at induced wrap angles as the media travels in the direction of media travel 816. In some approaches, the induced wrap angles may be set by adjusting the extent of protrusion of the lands 1034 of the second block 1030 into the channels 1006 of the first block 1020, e.g., by using positioners with nanometer precision so that, conversely, the second block 1030 may have channels 1036 that fit the lands 1004 of the first block 1020. Preferably, each induced wrap angle may be greater than zero degrees, and ideally greater than 1 degree.

In one approach, the widths of the lands 1034 of the second block 1030, as measured in the direction orthogonal (into the sheet of FIG. 10) to the direction of media travel 816, may be less than the width of the media, but the widths may be wider than the media in other approaches.

As shown, the lands 1034 of the second block 1030 are contoured in order to reduce interaction of the lands 1034 of the second block 1030 with the tape media.

The height $h_2$ of the lands 1034 of the second block 1030 may be at least as long as the height $h_1$ of the lands 1004 of the first block 1020.

In one approach, the lands 1034 of the second block 1030 may be aligned to the channels 1006 of the first block 1020 with guide pins (not shown) of conventional type and arrangement.

The second block 1030 may be formed of any desired material. In some approaches of apparatus 1000, the second block 1030 may include composite materials used in tool fabrication, such as silicon, zirconium nitride, AlTiC, silicon carbide, sapphire, etc.; a ceramic material, such as, calcium titanate; etc.

Figure 11:
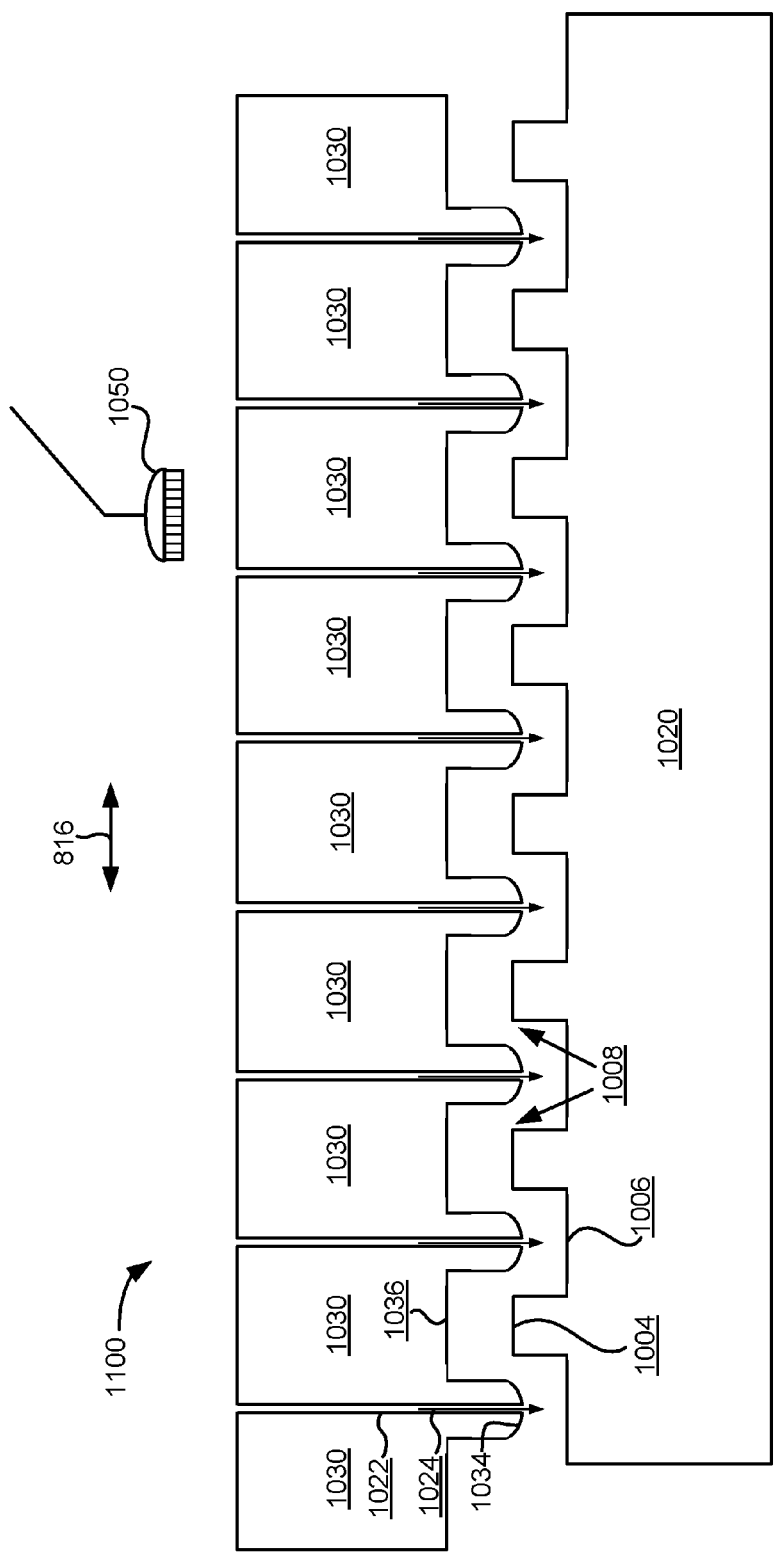
FIG. 11 is a side view of a set of blocks for burnishing tape media according to one embodiment.

FIG. 11 depicts an apparatus 1100 for burnishing tape media, in accordance with one embodiment. As an option, the apparatus 1100 may be implemented in conjunction with features from any other embodiment listed herein, such as those described with reference to the other FIGS. Of course, however, such an apparatus 1100 and others presented herein may be used in various applications and/or in permutations which may or may not be specifically described in the illustrative embodiments listed herein. Further, the apparatus 1100 presented herein may be used in any desired environment.

The apparatus 1100 may have similar features to the apparatus 1000 of FIG. 10, except as provided below, and accordingly has common numbering with FIG. 10.

The apparatus 1100 includes lands 1034 of the second block 1030 having openings 1022. e.g. cylindrical holes, slots, etc. to allow pressurized air 1024 to flow against the media to push the media toward the channels 1006 of the first block 1020. In some approaches of apparatus 1000, the openings 1022 may be configured to direct the pressurized air 1024 from the openings 1022 to provide an air film between the lands 1034 of the second block 1030 and the media for reducing friction between the media and the second block.

According to the embodiment shown on FIG. 11, the induced wrap angle may be set, at least in part, by adjusting the extent of protrusion of the lands 1034 of the second block 1030 into the channels 1006 of the first block 1020. The induced wrap angle formed at skiving edges 1008 of the lands 1004 of the first block 1020 as the media travels in the direction of media travel 816 may be greater than zero degrees, and more preferably in a range of about 0.1 to about 3 degrees.

In some embodiments, the lands 1034 of the second block 1030 are contoured without sharp edges in order to reduce interaction of the lands 1034 of the second block 1030 with the tape media.

In the embodiment of apparatus 1100, the media bearing surface of each of the lands 1004 of the first block 1020 may be planar, ideally with sharp, non-cusped edges.

According to one embodiment of a method for using the apparatus 1100, the method may involve running the media over the first block 1020 in the direction of media travel 816 one or more times.

One embodiment of apparatus 1100 may include a drive mechanism such as a motor or other known mechanism that is configured to cause the tape to move over the first block and a controller electrically coupled to the drive mechanism. For example, the motor or other known mechanism may drive a tape supply cartridge, e.g., tape supply cartridge 120 of FIG. 1A, and a take-up reel, e.g., take-up reel 121 also of FIG. 1A, of a drive in which the block is implemented in, to move the tape media over the block and/or other components of the drive.

In some approaches, the apparatus 1100 may include a mechanism 1050 for removing accumulated debris from the channels 1006. In one approach, a brush may sweep through the channels 1006 at periodic intervals. In another approach, the mechanism may use compressed air. Further approaches may use a fabric, swab or the like to wipe away debris. In further approaches, a rotating, vibrating or otherwise moving mechanism may be used. The mechanism 1050 may be automated, operate on demand, etc.

In another embodiment (not shown, but see FIG. 9 for reference) the apparatus 1100 may include channels of the first block having openings that connect to a vacuum source to urge the media toward the media bearing surface of the lands of the first block. Wrap angles of the media tape may be adjusted, e.g., to a low or high wrap angle, in response to the vacuum urging the magnetic recording tape downward.

In use, the embodiments described herein, of apparatus 800, 900, 1000, and 1100, may be employed in a media formatter, where the servo pattern is written to the tape, or before the tape media is used for writing, or after data has been written to the tape media. Multiple blocks may be used. Moreover, each block may have two or more lands, for example, 4, 16, 32, or more pairs of lands and channels. Media may be passed in only one or in both directions over the block(s).

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus for burnishing media, the apparatus comprising:
    a first block with a media bearing surface having a plurality of channels and lands,
    wherein the channels and lands alternate in a direction of media travel,
    wherein each of the lands has at least one skiving edge along a width thereof, the width of each land extending orthogonally to the direction of media travel; and
    a mechanism for inducing a wrap angle of the media relative to media bearing surfaces of at least three of the lands,
    wherein each induced wrap angle is greater than zero degrees, wherein at least some of the channels of the first block have an opening that connects to a vacuum source to urge the media toward media bearing surfaces of the lands of the first block.

2. An apparatus as recited in claim 1, wherein each induced wrap angle is in a range of about 0.1 to about 3 degrees.

3. An apparatus as recited in claim 1, wherein a media bearing surface of each of the lands is planar.

4. An apparatus as recited in claim 1, comprising a mechanism for removing accumulated debris from the channels.

5. A method for using the apparatus as recited in claim 1, comprising running the media over the first block in the direction of media travel.

6. An apparatus as recited in claim 1, further comprising:
    a drive mechanism for passing a magnetic medium over the first block; and
    a controller electrically coupled to the drive mechanism.

7. An apparatus for burnishing media, the apparatus comprising:
    a first block with a media bearing surface having a plurality of channels and lands,
    wherein the channels and lands alternate in a direction of media travel,
    wherein each of the lands has at least one skiving edge along a width thereof, the width of each land extending orthogonally to the direction of media travel; and
    a mechanism for inducing a wrap angle of the media relative to media bearing surfaces of at least some of the lands,
    wherein each induced wrap angle is greater than zero degrees,
    wherein the mechanism for inducing the wrap angles includes a second block positioned above the first block, the second block having lands positioned relative to the first block to push the media into the channels of the first block.

8. An apparatus as recited in claim 7, wherein the lands of the second block are contoured.

9. An apparatus as recited in claim 7, wherein the lands of the second block are aligned to the channels of the first block.

10. An apparatus as recited in claim 7, wherein the lands of the second block have openings to allow pressurized air to flow against the media to push the media toward the channels of the first block.

11. An apparatus as recited in claim 10, wherein the openings are configured to direct pressurized air from the openings to provide an air film between the lands of the second block and the media for reducing friction between the media and the second block.

12. An apparatus for burnishing media, the apparatus comprising:
    a first block with a media bearing surface having a plurality of channels and lands,
    wherein the channels and lands alternate in a direction of media travel,
    wherein each of the lands has at least one skiving edge along a width thereof, the width of each land extending orthogonally to the direction of media travel,
    wherein a width of at least some of the channels is less than a width of the media,
    wherein the channels are configured to create a subambient air pressure therein upon movement of the media relative thereto for inducing wrap angles of the media relative to media bearing surfaces of the lands.

13. An apparatus as recited in claim 12, wherein the induced wrap angles being greater than zero degrees.

14. An apparatus as recited in claim 13, wherein the induced wrap angles are in a range of about 0.1 to about 3 degrees.

15. An apparatus as recited in claim 12, wherein media bearing surfaces of each of the lands is planar.

16. An apparatus as recited in claim 12, comprising a mechanism for removing accumulated debris from the channels.

17. An apparatus as recited in claim 12, wherein the channels of the first block have openings that connect to a vacuum source to urge the media toward media bearing surfaces of the lands of the first block.

18. A method for using the apparatus as recited in claim 12, comprising running the media over the first block in the direction of media travel.

19. An apparatus as recited in claim 12, further comprising:
    a drive mechanism for passing a magnetic medium over the first block; and
    a controller electrically coupled to the drive mechanism.

* * * * *